No. 697,464. Patented Apr. 15, 1902.
F. W. FÖRSTER.
WHEELWRIGHT MACHINE.
(Application filed July 16, 1901.)
(No Model.)

Witnesses
G. F. Downing
D. G. Nottingham

Inventor
F. W. Förster
by H. A. Seymour
Atty.

THE NORRIS PETERS CO., PHOTO-LITHO., WASHINGTON, D. C.

UNITED STATES PATENT OFFICE.

FRIEDRICH WILHELM FÖRSTER, OF BURLINGTON, IOWA.

WHEELWRIGHT-MACHINE.

SPECIFICATION forming part of Letters Patent No. 697,464, dated April 15, 1902.

Application filed July 16, 1901. Serial No. 68,512. (No model.)

*To all whom it may concern:*

Be it known that I, FRIEDRICH WILHELM FÖRSTER, a resident of Burlington, in the county of Des Moines and State of Iowa, have invented certain new and useful Improvements in Wheelwright-Machines; and I do hereby declare the following to be a full, clear, and exact description of the invention, such as will enable others skilled in the art to which it appertains to make and use the same.

My invention relates to an improved wheelwright machine, the object of the invention being to provide an improved device of this character which will be simple in construction, comparatively cheap to manufacture, easy to operate, and which will be strong and durable when in use.

With this object in view the invention consists in certain novel features of construction and combinations and arrangements of parts, as will be more fully hereinafter described, and pointed out in the claims.

Figure 1:
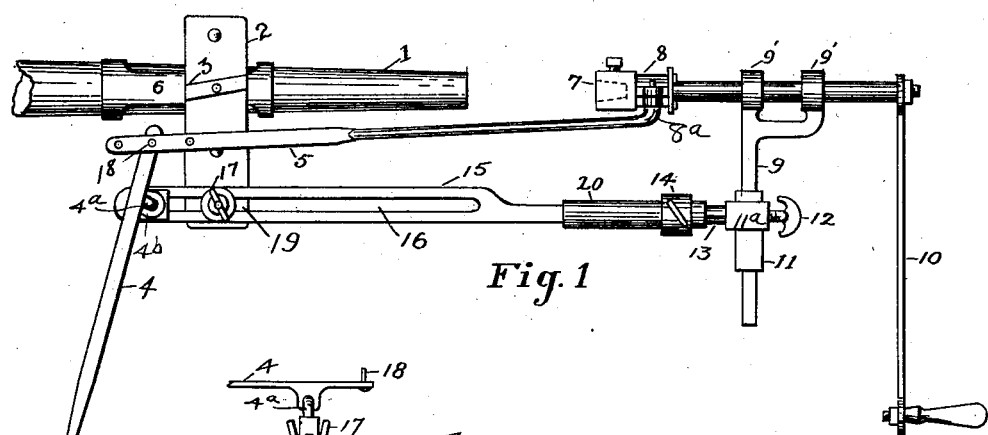
Figure 2:
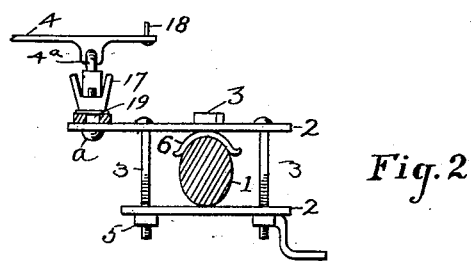
Figure 3:
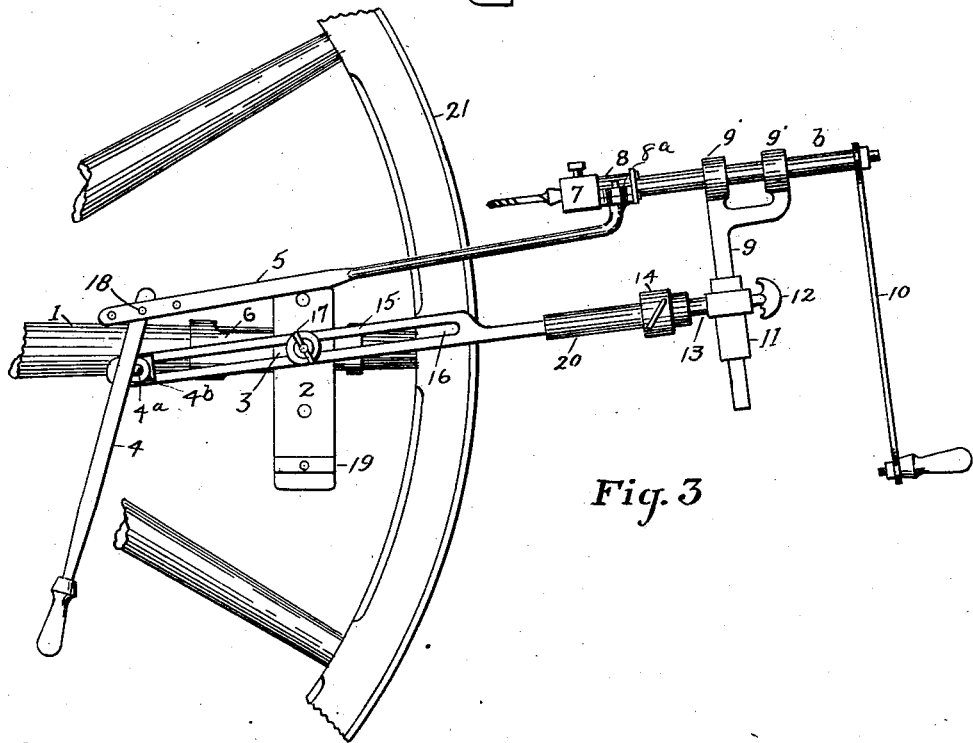

In the accompanying drawings, Figure 1 is a plan view illustrating my improvements constructed for use as a spoke-tenoning machine. Fig. 2 is a view in section on the line $x\,x$ of Fig. 1, and Fig. 3 is a plan view illustrating my improvements constructed for use as a tire and felly drill.

1 represents a spoke to which my improved device is secured, as will now be explained.

2 2 represent parallel bars spaced apart and connected by bolts 3 to form a clamp. The upper bar 2 is provided on its under face with a curved plate 6 to closely engage the spoke 1 and prevent lateral movement thereof, and nuts 5 are screwed onto the lower ends of bolts 3 below the lower bar 2 and securely clamp the spoke between said bars. The upper bar 2 is preferably longer than the lower bar and projects to one side of the spoke, as shown, and is provided on its upper face, above the plate 6, with a rib 3' and near its outer end with a rib 19. A bolt $a$ is passed up through said rib 19 and has mounted thereon a thumb-nut 17 to secure the slotted portion 16 of a rod 15 over the rib 19, which latter fits tightly in the slot 16, and prevent lateral or pivotal movement of the rod 15. A sleeve 20 is secured on the outer end of rod 15, and a rod 13 is adjustably secured in said sleeve by a set-screw 14 and carries a collar $11^a$ and sleeve 11 at its free end, projecting at right angles thereto, and a thumb-screw 12 is located in said collar $11^a$ and sleeve 11 to adjustably secure a rod 9 in said sleeve 11. The rod 9 is bifurcated at one end and provided in said bifurcated members with alined bearings 9' for a shaft $b$, and a crank 10 is secured to the outer end of shaft $b$ and a block 7 to the inner end thereof, a set-screw being located in said block to secure therein a tenoning or boring bit, as the case may be. A collar 8 is loosely mounted on shaft $b$ behind the block 7 and is provided with a perforated lug $8^a$ to receive the bent end of a long link 5, the other end of said link provided with a series of holes to receive in any one of which a pin 18 and pivotally connect the link to one end of a lever 4. The lever 4 is provided between its ends with a downwardly-curved lug $4^a$, mounted in a bearing $4^b$ on the inner end of rod 15 to fulcrum or pivot the lever between its ends.

The operation of my improvements is as follows: A tenoning-bit is secured in block 7 and the free end of lever 4 pulled outward to draw the shaft $b$ inward until the bit engages the end of spoke 1, when by turning the crank 10 with one hand and drawing the free end of the lever 4 outward with the other hand the bit will be fed forward to cut the tenon the proper length. It will be understood that the rod 13 can be adjusted in sleeve 20 and the rod 9 in sleeve 11 to center the bit on the spoke, and the rod 16 can be adjusted on the rib 19 by means of set-nut 17 to permit the proper operation of the device.

When the device is to be used as a tire and felly drill, the rod 15 is secured on the rib 3', as shown in Fig. 2. This rib 3' is inclined, as shown, to dispose the boring-tool midway between the spokes of wheel 21. In all other respects the construction and operation of the device are precisely as above described, save that a boring-bit is secured in block 7 in place of the tenoning-bit. Various other slight changes might be resorted to in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. In a wheelwright-machine the combination with a cutting mechanism, of a clamp for securing said cutting mechanism to a spoke, the said clamp having a plurality of seats or ribs for the attachment of said cutting mechanism whereby the latter may be adjusted for cutting a spoke, or the felly between spokes.

2. In a wheelwright-machine, the combination of a clamp to be secured to a spoke, a rod connected to said clamp, means for adjusting the rod to different positions on the clamp in a direction at right angles to the axis of the rod, a shaft carried by said rod, means on said shaft for securing a cutting-tool thereto, means for turning said shaft and means for moving the shaft longitudinally.

3. In a wheelwright-machine, the combination of a clamp to be secured to a spoke, a rod connected to said clamp, and disposed at right angles thereto, means for adjusting the rod to different positions on the clamp at right angles to the axis of the rod, a shaft carried by said rod, means on said shaft for securing a cutting-tool thereto, a crank for turning the shaft, and a lever pivoted between its ends and connected at one end to the shaft to move the latter toward or away from the spoke or wheel.

4. In a wheelwright-machine, the combination of a clamp to be secured to a spoke, a transverse rib on said clamp, a rod having a longitudinal slot to receive the rib, the said rod being adjustable longitudinally on the rib, means for locking the rod to the clamp, a rod adjustably secured to the outer end of the sliding rod and provided with bearings, a shaft mounted in said bearings and carrying a cutting-tool, a lever pivoted to the slotted rod at a point in rear of the clamp, and a link connecting said lever and shaft.

5. In a wheelwright-machine, the combination with a bar to be secured on a spoke, ribs on said bar, a rod slotted to receive either of said ribs, means for securing the rod on the ribs, another rod projecting at right angles to said first-mentioned rod and having a bearing for a shaft, means on said shaft for securing a cutting-tool thereto, means for turning said shaft, a lever pivoted between its ends on said first-mentioned rod and a link connecting one end of the lever with a collar loose on the shaft.

6. In a wheelwright-machine, the combination with a clamp to be secured on a spoke, a rod mounted on the clamp at right angles thereto, another rod adjustably secured to the outer end of said first-mentioned rod and bifurcated at one end, bearings in the bifurcated members of said last-mentioned rod, a shaft mounted in said bearings, a crank secured to the outer end of the shaft, a block on the inner end of the shaft to receive either a tenoning or a boring bit, a collar loose on the shaft, a lever pivoted between its ends on said first-mentioned rod, a link connecting said lever and collar and means for securing the first-mentioned rod at different adjustments on the clamp at right angles to the axis of the rod, to dispose the cutter in line with a spoke, or in line with the tire between two spokes.

In testimony whereof I have signed this specification in the presence of two subscribing witnesses.

FRIEDRICH WILHELM FÖRSTER.

Witnesses:
  WM. BOUGERT,
  GEO. SMITH.